June 20, 1967 — J. G. KUNSCH — 3,326,598
RETRACTABLE COVER DEVICE
Filed July 12, 1965 — 3 Sheets-Sheet 1

JOHN G. KUNSCH
INVENTOR

BY
BUCKHORN, BLORE, KLARQUIST & SPARKMAN
ATTORNEYS

June 20, 1967 J. G. KUNSCH 3,326,598
RETRACTABLE COVER DEVICE
Filed July 12, 1965 3 Sheets-Sheet 2

JOHN G. KUNSCH
INVENTOR
BY
BUCKHORN, BLORE, KLARQUIST & SPARKMAN
ATTORNEYS

June 20, 1967   J. G. KUNSCH   3,326,598
RETRACTABLE COVER DEVICE
Filed July 12, 1965   3 Sheets-Sheet 3

JOHN G. KUNSCH
INVENTOR

BY
BUCKHORN, BLORE, KLARQUIST & SPARKMAN
ATTORNEYS

United States Patent Office 3,326,598
Patented June 20, 1967

3,326,598
RETRACTABLE COVER DEVICE
John G. Kunsch, P.O. Box 604, Kelso, Wash. 98626;
Hazel B. Kunsch, executrix of said John G. Kunsch, deceased
Filed July 12, 1965, Ser. No. 471,163
7 Claims. (Cl. 296—105)

The present invention relates to an extensible cover device and more particularly to a retractable cover for utilization on trucks or like vehicles.

An object of the present invention is to provide a cover device that may be stored in a compact arrangement and quickly and easily extended to cover a given area and subsequently quickly and easily again retracted.

Another object of the invention is to provide a cover device of the class described that will be substantially rigid when extended.

Still another object of the invention is to provide a new and improved arrangement for effecting extension and retraction of a covering device of the class described.

Other objects and advantages of the invention will become more apparent hereinafter.

In accordance with an illustrated embodiment of the invention, I have provided a truck cover comprising a plurality of hoop-like struts sliding at their lower ends in tracks extending along the edge of a flat bed truck. The struts are connected by hinged braces which in the extended position of the cover are in a substantially straight line so that the struts are held rigidly apart with respect to one another. New and novel means are provided for causing folding of the braces when the cover is retracted so that the struts may be drawn closely adjacent one another in the folded position and the cover retracted substantially completely from over the truck bed.

For a more complete description of the invention reference is made to the accompanying drawings wherein.

Figure 1:
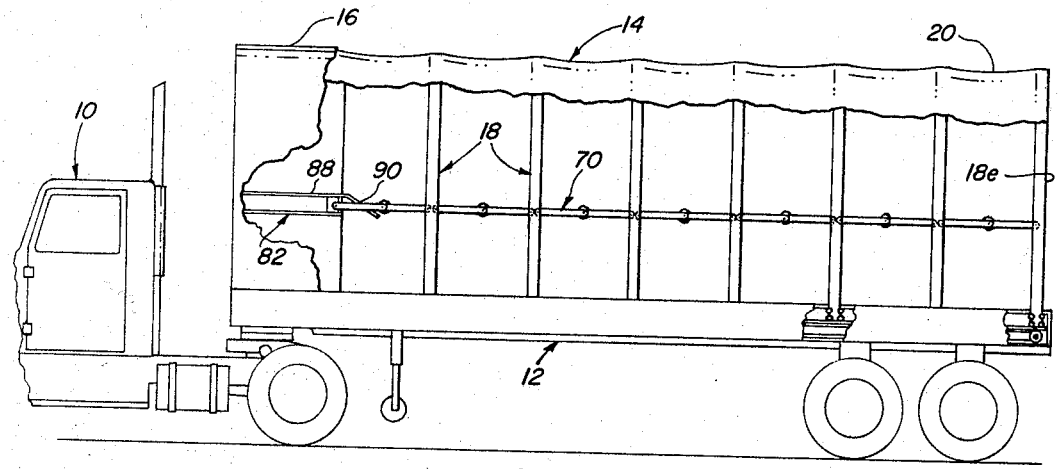
FIG. 1 is a side elevation of a truck having the invention incorporated therein.

The embodiment of the invention shown in FIGS. 1 to 6 is mounted on a truck 10 having a flat bed 12 with the cover 14 of the invention shown in extended position upon the bed. The bed is provided with a hood 16 into which the cover can be retracted in a manner to be described. The cover 14 comprises a plurality of hoop-like struts 18 over which flexible covering material such as canvas 20 is stretched.

Figure 2:
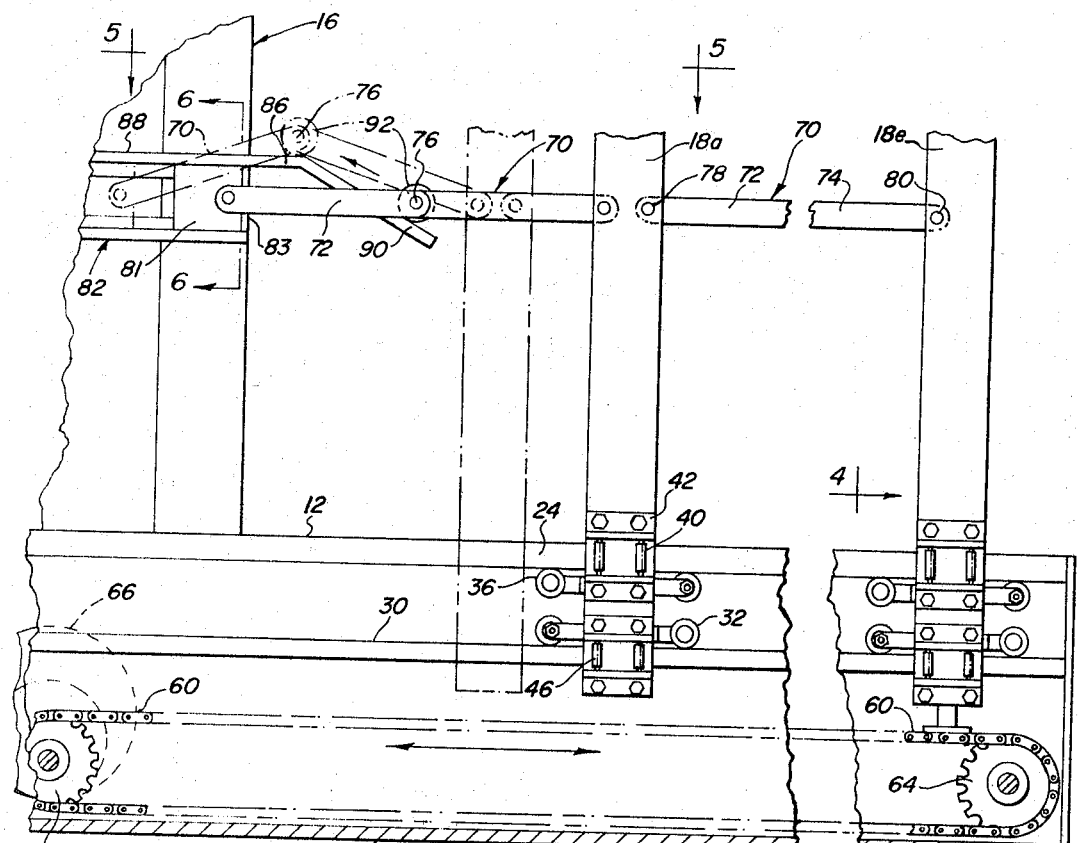
FIG. 2 is an enlarged, fragmentary elevation of a portion of a cover device made in accordance with the invention, the view being taken along line 202 of FIG. 3.
Figure 3:
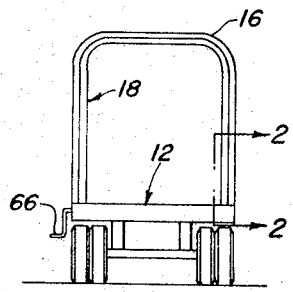
FIG. 3 is an end view of the truck of FIG. 1.
Figure 4:
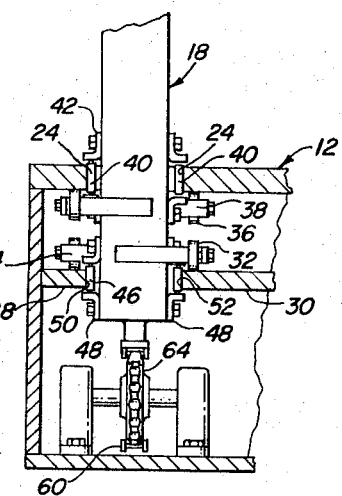
FIG. 4 is a fragmentary sectional view taken along line 4—4 of FIG. 2.

Referring to FIGS. 2 and 4, the bed 12 is provided with means for slidably guiding the lower ends of the struts 18 as they are moved between their retracted position within the hood 16 and an extended position wherein they are spaced equidistantly along the length of the bed.

In the presently described embodiment, the bed 12 is provided with a slot 24 along each of the opposite sides thereof through which the lower ends of the struts 18 extend. Since the arrangement on each side is the same, that of only one side will be described in detail. A pair of horizontal rails 28, 30 are suitably supported beneath a slot 24 and upon which rails engage rollers 32 mounted on arms 34 fixed to and extending laterally from the struts 18. There are two rollers 32 mounted on each strut and positioned so as to be one fore and one aft of each strut, as most clearly shown in FIG. 2. with respect to the direction of motion of the strut, and one on each side of the strut. There are also two rollers 36 associated with each strut for engaging the undersurface of the deck 12 and they likewise are positioned so as to be one fore and one aft of each strut and one on each side. Guide rollers 40 are mounted on brackets 42 on each strut 18 to engage the side surfaces 44 of a slot 24 and guide rollers 46 mounted on brackets 48 are secured to the lower end of each strut and to engage the edge surfaces 50, 52 of the rails 28, 30 respectively.

Means are provided to cause movement of the endmost strut 18e between the hood 16 and the remote end of the truck bed 12. Such means comprises a drive chain 60 extending over a sprocket 62 at the front end of the bed 12 and a further sprocket 64 mounted at the rear end of the truck bed 12 and to which the strut 18e is fixed at its lower end by any suitable means. Means such as a motor or hand crank 66 may be provided to drive the sprocket 64 to effect movement of the chain 60.

Braces 70 extend between each adjacent pair of struts 18, each brace comprising a pair of links 72, 74 pivotally connected together at one end thereof, the opposite ends of the links being connected one to each of the adjacent struts. The pivotal connection of link 72 to a strut is indicated at 78 and the pivotal connection of link 74 to a strut is indicated at 80. The pivot connection 78, 80 of all of the links is substantially of the same horizontal plane and the links 72, 74 are of such length that when the struts 18 are in their extended, operative position along the truck bed, the braces 70 are fully extended and the pivot points of each brace are substantially in the same plane thus to hold the struts substantially rigidly apart.

A brace 70 also is connected to extend between the cover 16 and first strut 18a adjacent thereto. The link 72 of such brace is pivotally connected to a block 81 mounted within a horizontal slide 82 extending along the sidewall of the cover 16. A stop 83 is provided on the slide for engaging the block 81 to limit its movement toward the rear of the truck so as to cause all of the braces 70 fully to extend.

Figure 5:
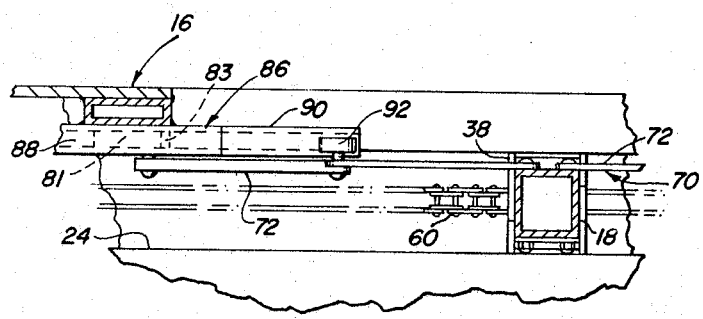
FIG. 5 is a fragmentary sectional view taken along line 5—5 of FIG. 2.
Figure 6:
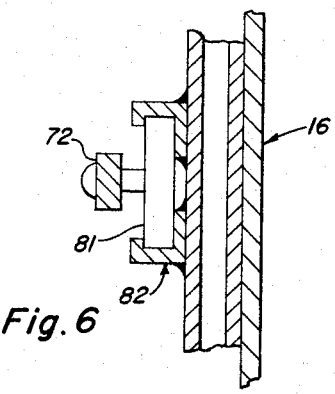
FIG. 6 is a fragmentary sectional view taken along line 6—6 of FIG. 2.

Cam means are provided for reflecting "breaking" of the braces 70 to permit the struts to be moved together when it is desired to collapse the cover 14. Referring more particularly to FIGS. 2 and 5, extending rearwardly from the hood 16 along each of the opposite sides of the truck bed is a breaker member 86 having a horizontal portion 88 above the plane of the pivots 78, 80 extending rearwardly from the hood 16 by a distance just slightly less than the extended position of the pivot 76 between the first strut 18a on the hood 16 in the extended position of the cover. Extending further rearwardly from such horizontal portion 88 but angularly downwardly, is a further portion 90. A projection 92 in the form of a cam follower projects inwardly from the end of each link 72 adjacent the pivot point 76. As the chain 60 is driven to cause the end strut 18e to move toward its collapsed position all of the struts are forced to move toward the forward end of the bed. When the cam follower 92 on a brace engages the breaker portion 90 the latter acts as a cam means and the upwardly inclined surface thereof urges the corresponding link upwardly to "break" the brace 70 thus permitting the struts connected by such brace to move toward one another.

The canvas covering 20 may be secured in any suitable manner to the struts 18.

As will be apparent the cover 14 may be easily extended from a retracted position beneath the hood 16 and when extended will be held substantially rigidly by reason of the arrangement of the braces 70 between the struts. When it is desired to retract the cover it may be easily accomplished by the action described above.

Still another embodiment of the invention is illustrated in FIGS. 7 to 10. Such embodiment comprises a cover 96 and a plurality of hoop-like struts 102 the opposite ends of which extend downwardly into slots or tracks 106 formed along each edge of the truck bed 98 and extending longitudinally thereof. The slots 106 are recessed along each of the opposite sides thereof to form upper track surfaces 110 and lower track surfaces 112. Four rollers 114, 115, 116, 117 are mounted on each strut for engaging such track surfaces. The rollers 114, 117 are on one side of the strut, the roller 114 engaging the upper surface 110 forwardly of the strut, the roller 117 engaging the lower surface 112 rearwardly of the strut. The rollers 115, 116 are on the opposite side of the strut. The roller 115 engages the lower surface 112 forwardly of the strut and the roller 116 engages the upper surface 110 rearwardly of the strut. Rollers 118 are suitably mounted on each of the opposite side surfaces of each strut 102 for engaging the side surfaces 119 of the slot 106 both above and below the recess 108.

Figure 7:
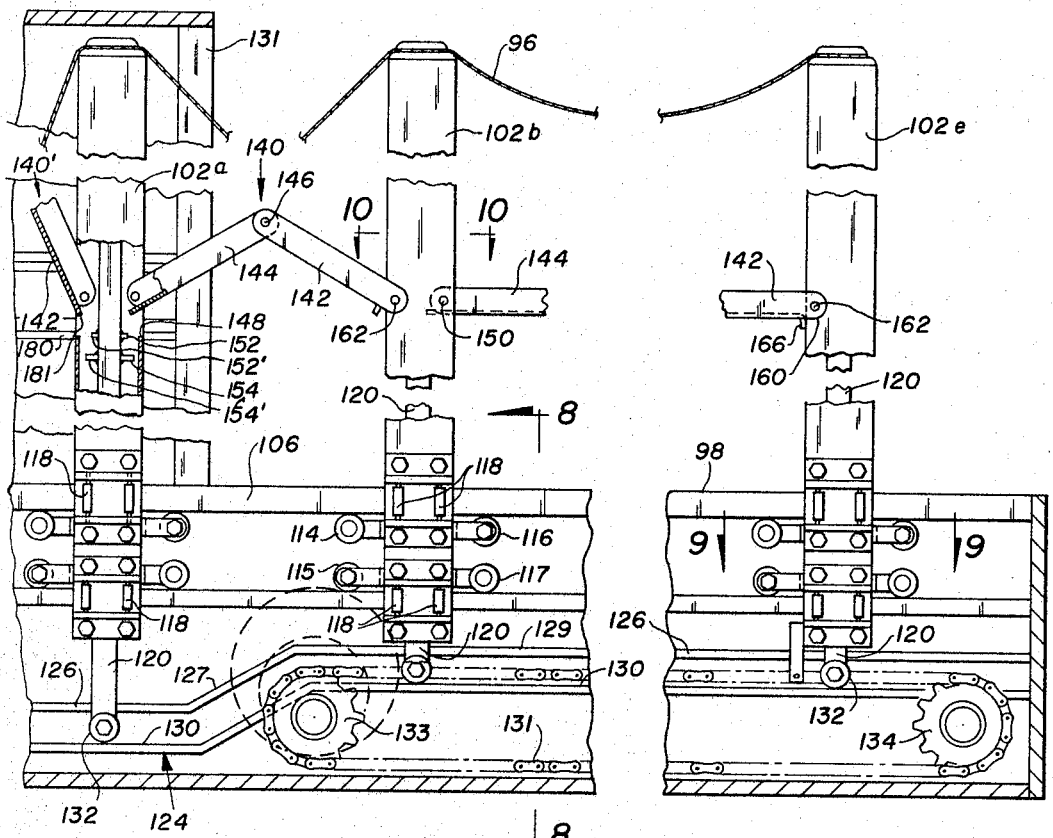
FIG. 7 is a fragmentary elevation of a modification of the invention taken along line 7—7 of FIG. 8.
Figure 8:
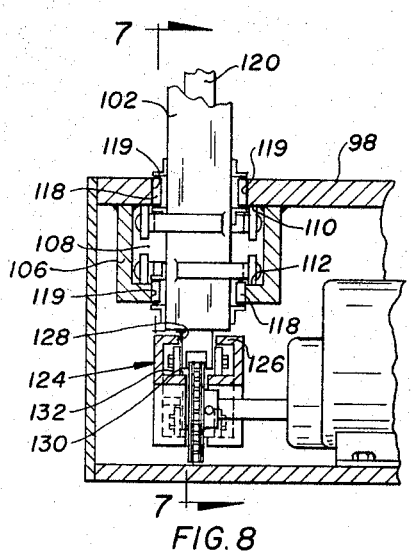
FIG. 8 is a sectional view taken along line 8—8 of FIG. 7.
Figure 9:
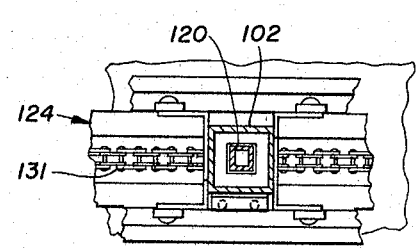
FIG. 9 is a sectional view taken along line 9—9 of FIG. 7.
Figure 10:
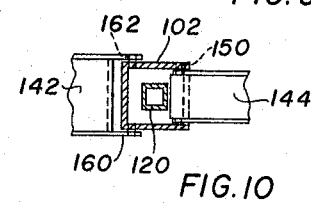
FIG. 10 is a sectional view taken along line 10—10 of FIG. 7.

The strut 102 is preferably square in outline and is hollow and has mounted therein for vertical sliding movement a rectangular breaker member 120 the lower end of which extends outwardly of the lower end of the strut and downwardly through a slot 128 in the upper edge of a track defining member 124, see FIG. 8. Such latter member is of hollow rectangular cross section and has inwardly turned flanges 126 along its upper edge defining the slot 128 and defining tracks 130 for engaging rollers 132 rotatably mounted on the opposite sides of the lower end of the breaker member 120. Referring to FIG. 7 the track member 124 extends horizontally rearwardly from the forward end of the truck bed to a point about even with the rearward side of the hood 131 and then is inclined upwardly for a short distance and thereafter extends horizontally at 120 to the rearward end of the truck bed. As will be apparent as a strut 102 moves forwardly or rearwardly on the truck bed past the inclined section 127 the breaker member 120 thereof will be moved upwardly or downwardly corresponding to the direction of movement of the strut. The section 129 of the track member 124 is formed with a slot in the bottom surface thereof for receiving the upper flight of a flexible chain or member 131 trained about a sprocket 133 adjacent the inclined section 126 and a sprocket 134 at the rearward end of the truck bed 98 The breaker member 120 of the rearmost strut 102e is connected to the chain 131 so that by movement of the chain the strut 102e may be moved forwardly or rearwardly of the truck bed.

Extending between each pair of struts 102 on each side of the truck is at least one brace 140 comprising a link 142 pivotally connected at one end thereof to one strut 102 of a pair and a link 144 pivotally connected at one end thereof to the next adjacent strut 102, the links being pivotally connected together at their opposite ends as indicated at 146. The struts 102 are formed with an opening 148 in a side wall thereof for receiving the end of the link 144 connected thereto. The links 144 are connected to the struts 102 by pivot pins 150 extending through the side walls of the strut. The end of a link 144 defines a tongue which is contacted by projections 152 and 154, on the breaker member 120 as it moves vertically. Thus as the breaker member moves downwardly within the strut 102 the projection 152 engages the end or tongue of the link 144 to pivot the same about the pivot pin 150. That is, downward movement of a breaker member 120 will cause the outwardly extending portion of the link 144 to swing upwardly. Upon upward movement the projection 154 will engage the tongue to swing the link downwardly.

The links 142 are provided with ears 160 which straddle the strut 102 and through which ears extend pivot pins 162 pivotally to connect the link to the strut. Each link 142 is provided with a downwardly extending projection 166 which engages the side surface of the strut 102 when the link 142 is moved to a horizontal position.

As in the previous embodiment the braces 140 are of such length that each of the braces extending between the pairs of struts 102 is fully extended when the endmost strut 102e is at the rearward end of the truck bed 12. The link 144 (not shown) of the brace 140$^1$ extending between the first strut 102a and the hood 131 is suitably connected to a block mounted within a slide 180 in the same manner as in the previously described embodiment. However, the link 142$^1$ of the brace 140$^1$ is mounted to the strut 102a in a manner similar to the links 144. That is, the link 142$^1$ is provided with a tongue 181 which extends inwardly of the strut 102a through an opening therein and which is adapted to be engaged by projections 152$^1$, 154$^1$ on the breaker member of such strut so as to cause such link to pivot as the strut moves past the inclined track portion 127.

The hood 131 is of slightly greater length than the brace 140$^1$ so that the strut 120a moves past the inclined section 127 before the block in slide 180 engages the forward end of the hood 131 during collapsing movement. Thus, as strut 102a moves over the section 127 the brace 140$^1$ will be caused to "break" as will the brace 140 between the strut 102a and the succeeding strut 102b. As each succeeding strut moves past such inclined section, the brace operated thereby will similarly "break" until finally all struts are moved to collapsed position within the hood 131.

Upon extension of the cover the opposite movement will occur. As will be apparent in this embodiment the track member 124 constitutes a cam means and the breaker member and associated tongue portions of the links constitute cam followers.

While the invention has been illustrated in connection with a truck it is obviously adaptable to numerous other environments.

Having illustrated and described a preferred embodiment of the invention, it should be apparent to those skilled in the art that the invention permits of modification in arrangement and detail. I claim as my invention all such modifications as come within the true spirit and scope of the following claims.

I claim:

1. In an extensible cover device,
a plurality of vertical struts,
horizontal track means for guiding the movement of said struts along a straight path,
a brace extending between each adjacent pair of struts,
each of said braces comprising a pair of links pivotally connected together at one end thereof, the opposite ends of said links being pivotally connected to separate struts of a said pair of struts with the pivot axes of the connections to said pair of struts substantially in the same horizontal plane,
said struts being movable along said path from a collapsed position adjacent a predetermined point to an extended position wherein said braces are fully extended and the pivot points of each brace are all substantially aligned in the said plane thus to hold said struts rigidly apart.
and means positioned adjacent said path engageable with said braces as they move along said path for moving said links to an unaligned position as said struts are moved from an extended to a retracted position whereby said links may fold.

2. In an extensible cover device;
a pair of vertical struts,
horizontal track means for guiding the movement of said struts along a straight path,
a brace extending between said struts,
said brace comprising a pair of links pivotally connected together at one end thereof, the opposite ends of said links being pivotally connected one to each of said struts with the pivot axes of the connections to said pair of struts substantially in the same horizontal plane,
said struts being movable along said path from a collapsed position wherein said struts are closely adjacent one another to an extended position wherein said brace is fully extended and the pivot points of said brace are substantially in the same plane thus to hold said struts rigidly apart,
and cam means adjacent the path of movement of said struts and cam follower means connected to said links for moving the point of connection out of said plane as said struts are moved from said extended toward said retracted position whereby said links may fold.

3. In a device of the class described;
a pair of vertical struts,
a brace extending between said struts and comprising a pair of links pivotally connected together at one end thereof, the opposite ends of said links being pivotally connected one to each of said struts with the pivot axes of the connections to said struts in the same horizontal plane,
one of said struts being hollow and having an opening in the side thereof facing the other strut adjacent the point of connection of a link to said one strut,
a breaker member mounted in said one strut for vertical sliding movement therein,
the said link attached to said one strut having a tongue extending inwardly of said one strut through said opening,
and means on said breaker member for engaging said link tongue as said breaker member is moved vertically with respect to said one strut to effect pivotal movement of said one link about its connection to said one strut.

4. In a device of the class described;
a pair of vertical struts,
a brace extending between said struts and comprising a pair of links pivotally connected together at one end thereof, the opposite ends of said links being pivotally connected one to each of said struts with the pivot axes of the connections to said struts in the same horizontal plane,
one of said struts being hollow and having an opening in the side thereof facing the other strut adjacent the point of connection of a link to said one strut,
a breaker member mounted in said one strut for vertical sliding movement therein,
the said link attached to said one strut having a tongue extending in toward one strut through said opening,
means on said breaker member for engaging said link tongue as said breaker member is moved vertically with respect to said one strut to effect pivotal movement of said one link about its connection to said one strut,
track means for engaging the bottom ends of said struts and guiding them along a straight, horizontal path,
said breaker member extending outwardly of the bottom of said one strut,
guide means engaging the lower end of said breaker member including a first horizontal portion positioned below said track means a first predetermined distance, a second horizontal portion positioned below said track means a different distance than said predetermined distance, and an inclined third portion extending between said first and second portions as said one strut is moved along said track means said breaker member is raised or lowered as it moves past guide means third portion to cause pivoting of said one link.

5. In an extensible cover device for a truck or like vehicle the invention comprising:
a truck having a flat bed,
a plurality of struts for supporting said cover adapted to be moved from a collapsed cover position in which said struts are closely adjacent one another at one end of said bed to an extended position wherein said struts are spaced substantially equidistantly along said bed,
a brace extending between each adjacent pair of struts, each of said braces comprising a pair of links pivotally connected together at one end thereof,
the opposite ends of said links being pivotally connected one to each of the braces of a said pair thereof,
the pivot axes of said pivotal connections being horizontal and the pivotal connections of a brace to an adjacent pair of links being in the same horizontal plane,
a breaker element mounted on each of said struts for vertical movement with respect thereto,
means on said breaker element for engaging one of the links connected to such brace and causing movement of the same about its pivotal axis upon vertical movement of the breaker element,
and interengaging means on said truck bed and said breaker element for effecting vertical movement thereof at a predetermined point along said truck bed as said struts are moved from their extended to their retracted positions whereupon each said breaker element causes the link engaged thereby to rotate about its axis to effect movement of the connecting pivot of a pair of links from a dead center position so that said links may fold to permit movement together of the pair of struts connected by said links.

6. In an extensible cover device for a truck or like vehicle the invention comprising;
a truck having a flat bed,
a plurality of struts for supporting said cover adapted to be moved from a collapsed position in which said struts are closely adjacent one another at one end of said bed to an extended position wherein said struts are spaced substantially equidistantly along said bed,
track means along an edge of said bed for receiving the corresponding ends of said struts to guide the movement of the same,
a brace extending between each adjacent pair of struts,
each of said braces comprising a pair of links pivotally connected together at one end thereof,
the opposite ends of said links being pivotally connected one to each of the braces of a said pair thereof,
the pivot axes of said pivotal connections being horizontal and the pivotal connections of a brace to an adjacent pair of links being in the same horizontal plane,
said struts being hollow,
a breaker element mounted in each of said struts for vertical movement therein,
means on said breaker element for engaging one of the links connected to such brace and causing movement of the same about its pivotal axis upon vertical movement of the breaker element,
each said breaker element extending outwardly of the bottom of said struts,
and interengaging means on said truck bed and said actuating elements for effecting downward movement thereof at a predetermined point along said truck bed as said struts are moved from their extended to their retracted positions whereupon each said breaker element causes the link engaged thereby to rotate about its axis to effect movement of the connecting pivot of a pair of links from a dead center position so that said links may fold to permit movement together of the pair of struts connected by said links.

7. In an extensible cover device for a truck or like vehicle;

a plurality of vertical struts for such cover, means for engaging the lower end of said struts and guiding the same along a predetermined straight path of predetermined extent, said struts being adapted to be moved from a closed position in which they are closely adjacent one another at one end of said path to an extended position wherein they are positioned at substantially equal distances apart along the extent of said path, a brace extending between each adjacent pair of said struts, each said brace comprising a pair of links pivotally connected together at one end thereof, the opposite ends of said links being pivotally connected to separate struts of a said pair of struts with the pivot axes of the connections to said pair of struts substantially in the same horizontal plane, said links being of such length that said braces are fully extended and all the pivot points of each brace are in said horizontal plane when the struts are in their extended position, means for applying a force to the strut most remote from said one end of said path to cause it to move towards said one end, and means for causing movement of the pivotal connection between each pair of links to an off center position as said struts move toward said one end, said last mentioned means comprising an element presenting an inclined surface and means extending from each of said braces for engaging said surface upon movement of said struts toward said closed position whereupon the pivotal connection between each pair of said links is thrown off center permitting folding of said braces.

References Cited

UNITED STATES PATENTS

| | | | |
|---|---|---|---|
| 905,571 | 12/1908 | Pangborn | 296—105 |
| 1,263,759 | 4/1918 | Hanaway | 296—105 |
| 2,284,003 | 5/1942 | Luppert | 74—520 X |
| 2,314,144 | 3/1943 | Hicks | 108—81 |

FOREIGN PATENTS

| | | |
|---|---|---|
| 186,820 | 10/1922 | Great Britain. |
| 580,711 | 9/1946 | Great Britain. |

BENJAMIN HERSH, *Primary Examiner.*

C. C. PARSONS, *Assistant Examiner.*